Dec. 2, 1955  E. D. TILLYER  2,727,843
LAMINATED STRUCTURES
Filed June 3, 1950

INVENTOR
EDGAR D. TILLYER
BY
ATTORNEY

United States Patent Office 2,727,843
Patented Dec. 20, 1955

2,727,843

LAMINATED STRUCTURES

Edgar D. Tillyer, Southbridge, Mass., assignor to American Optical Company, Southbridge, Mass., a voluntary association of Massachusetts Application June 3, 1950, Serial No. 165,973

3 Claims. (Cl. 154—2.77)

This invention relates to improvements in laminated structures and has particular reference to laminated lenses formed of transparent materials held in bonded relation with each other by a transparent adhesive and method of making same.

Resinous materials have been tried as adhesives for cementing laminations of glass or glass and plastic in manufacturing lenses. Thermoplastics and thermosetting resins of various kinds have been employed for this purpose but are generally unsatisfactory for several reasons, among them being the requirement of long curing times at controlled temperatures and under controlled atmospheric conditions, poor bonding, shrinkage, impermanence, and undesirable indices of refraction.

Therefore, it is a principal object of this invention to provide novel means and method of efficiently bonding together the layers of a laminated article such as a lens.

Another object is to provide a laminated lens embodying superimposed layers of transparent materials having layers of cementitious material therebetween permanently bonding together the layers of transparent materials and securely retaining them from separation or relative movement.

Another object is to provide a laminated lens of the above character, the laminations of which will remain securely bonded together under extreme moisture and heat such as is incurred, for example, when subjecting the lens to boiling water.

Another object is to provide a laminated lens of the above character which is capable of being subsequently shaped such as by edging to a desired contour shape or ground to desired surface curvatures without impairment.

Another object is to provide a lens embodying superimposed layers of glass having a light altering film therebetween, with said glass layers and film being cemented together by improved adhesive means which readily bonds to both glass and film and relatively permanently retains said bond.

Another object is to provide a laminated lens of the above character having ultra-violet absorption characteristics provided by the cementitious material used in bonding the laminations together.

Another object is the provision of improved adhesion means for bonding the laminations of lenses of the above character, which adhesion means is capable of being made and used under normal conditions and embodies a very thin layer of albumin or casein disposed upon said laminations, with the laminations subsequently being bonded together by a resinous or similar cement into a relatively inseparable permanent lens unit.

Another object is to provide a lens formed of laminations of glass having a layer of extremely thin plastic film disposed therebetween and efficiently inseparably bonded thereto by cementitious material supplemented by very thin depositions of albumin or casein.

Other objects and advantages will become apparent from the following description taken in connection with the accompanying drawing, in which.

Figure 1:
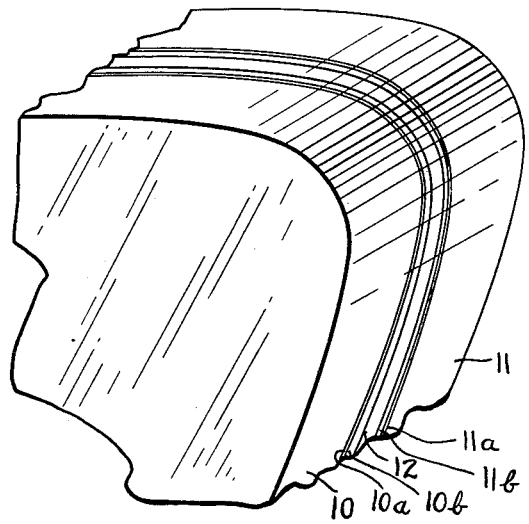
Fig. 1 is a fragmentary perspective view of a lens embodying the invention.
Figure 2:
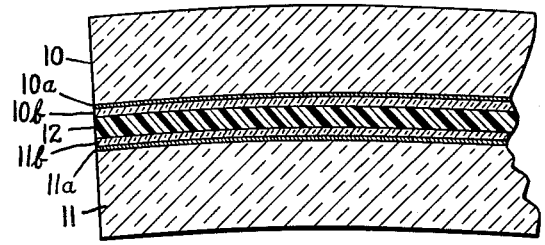
Fig. 2 is a sectional view of the lens shown in Fig. 1.

Referring to the drawing, wherein like characters of reference designate like parts throughout the several views, the lens shown in Figs. 1 and 2 comprises primarily a pair of glass components 10 and 11 having a sheet 12 of transparent plastic or artificial resinous material therebetween. The glass may be any type suitable for optical instrument lenses, ophthalmic lenses, or the other devices, may be colored or clear as desired, and may be flat, or meniscus-shaped or provided with any desired surface and edge configurations.

The plastic or artificial resinous film 12 may be any type which has proven satisfactory for use in lenses of the character described herein such as cellulose acetate and cellulose butyrate. Such films generally are available in substantially thick sheets and are readily bonded to glass by known adhesives. However, in some cases it may be necessary to use the plastic in extremely thin sheets such as polyvinyl alcohol which may be stretched and dehydrated by heat in the presence of acid. Such sheets, in thicknesses of approximately .001" are very difficult to bond to glass by conventional and other known adhesives, and are easily separated when lenses laminated with such sheets are subjected to extreme moisture and heat such as occurs, for example, when the lenses are subjected to boiling water tests.

Therefore, in accordance with this invention, the inner surface of each of the glass components 10 and 11 are provided with a layer of albumin or casein 10a and 11a respectively. The layers 10a and 11a are very thinly deposited on the glass components, preferably by known spinning processes, and subsequently allowed to thoroughly dry.

The preferable ingredient is egg albumin which may be mixed thoroughly with water in the amounts necessary to obtain the desired consistency, and subsequently strained, or which may be in dehydrated or powder form which must be dissolved in water in order to be used.

After the albumin is thoroughly dried on the glass, the film 12 is laminated to the glass components 10 and 11 by means of layers 10b and 11b of adhesive, the adhesive layers being disposed between the film 12 and the layers 10a and 11a.

The lens produced in accordance with the foregoing is then heated until cured, which heating cycle will preferably be controlled in accordance with the particular adhesive used.

The adhesive may be any of the known types of thermosetting or thermoplastic resins suitably compounded so as to result in a substantially colorless cement of a relatively stable nature and having an index of refraction substantially the same as the glass used in forming the laminations 10 and 11.

A desirable cement for this purpose comprises rosin, chlorinated paraffin wax and phenyl salicylate which are thoroughly mixed and cooled, and supplemented with a controlled amount of a thermosetting resin. A preferred formula for this cement would be approximately 50 parts by weight of rosin, 30 parts by weight of phenyl salicylate, 150 parts by weight of chlorinated paraffin wax, and 150 parts by weight of a thermosetting resin such as polyethylene glycol dimethacrylate. Before using, reaction of the ingredients of this cement composition should be started by adding a controlled amount of a catalyst to the mixture. This cement by reason of its phenyl silicylate content possesses ultraviolet absorbing characteristics whereby the resultant laminated lens will be particularly desirable for use in sun glasses.

Another suitable cement can be made according to the following formula:

79.5% of resin
20% of tetraethylene glycol methacrylate
.5% of tertiary butyl hydroperoxide.

Still another cement is formed of the following:

12% rosin
7% phenyl salicylate
36% tetraethylene glycol methacrylate
36% chlorinated paraffin wax
9% diallyl phthalate The glass components or the film may be provided with desired color or light altering characteristics if desired. It will be understood that a laminated lens, when produced by bonding the laminations in the manner described hereinabove, will possess all of the aforementioned improvements over prior laminated lenses formed by using known adhesives and methods of bonding.

It will be seen from the foregoing that all of the objects and advantages of the invention have been accomplished. While certain novel features of the invention have been shown and described and are pointed out in the annexed claims, it will be understood that various omissions, substitutions and changes in the means and method shown and described may be made by those skilled in the art without departing from the spirit of the invention. It is not desired, therefore, that the invention be limited to the exact means and methods disclosed.

I claim:

1. In a lens, the combination of a glass component and a plastic component secured together by a layer of transparent cement therebetween comprising a mixture of rosin, chlorinated paraffin wax, phenyl salicylate and polyethylene glycol dimethacrylate, said glass component having on its cement receiving surface a thin film of an ingredient selected from the group consisting of casein and albumin whereby said components are more strongly bonded to each other.

2. In a lens, the combination of a glass component and a plastic component secured together by a layer of transparent cement therebetween comprising a mixture of rosin, chlorinated paraffin wax, phenyl salicylate and polyethylene glycol dimethacrylate, said glass component having on its cement-receiving surface a thin film which consists only of albumin whereby said components are more strongly bonded to each other.

3. In a lens, the combination of a glass component and a plastic component secured together by a layer of transparent cement therebetween comprising a mixture of rosin, chlorinated paraffin wax, phenyl salicylate and polyethylene glycol dimethacrylate, said glass component having on its cement-receiving surface a thin film which consists only of casein whereby said components are more strongly bonded to each other.

References Cited in the file of this patent

UNITED STATES PATENTS

| | | |
|---|---|---|
| 1,182,739 | Benedicuts | May 9, 1916 |
| 1,342,268 | Mascart | June 1, 1920 |
| 1,963,569 | Wampler | June 19, 1934 |
| 2,155,590 | Garvey | Apr. 25, 1939 |
| 2,157,068 | Carruthers | May 2, 1939 |
| 2,524,960 | Cottet | Oct. 10, 1950 |

FOREIGN PATENTS

| | | |
|---|---|---|
| 458,553 | Canada | Aug. 2, 1949 |